(12) United States Patent
Lohmann et al.

(10) Patent No.: US 9,799,933 B2
(45) Date of Patent: Oct. 24, 2017

(54) SOLID STATE BATTERY WITH INTEGRATED RATE BOOSTER

(71) Applicant: Robert Bosch GmbH, Stuttgart (DE)

(72) Inventors: Timm Lohmann, Mountain View, CA (US); Bernd Schumann, Rutesheim (DE); John F. Christensen, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 510 days.

(21) Appl. No.: 14/468,734

(22) Filed: Aug. 26, 2014

(65) Prior Publication Data

US 2015/0064534 A1  Mar. 5, 2015

Related U.S. Application Data

(60) Provisional application No. 61/870,817, filed on Aug. 28, 2013.

(51) Int. Cl.
*H01M 10/657* (2014.01)
*H01M 4/64* (2006.01)
(Continued)

(52) U.S. Cl.
CPC ........... *H01M 10/654* (2015.04); *H01M 2/14* (2013.01); *H01M 4/64* (2013.01); *H01M 4/75* (2013.01); *H01M 10/052* (2013.01); *H01M 10/0562* (2013.01); *H01M 10/0585* (2013.01); *H01M 10/613* (2015.04); *H01M 10/615* (2015.04); *H01M 10/6571* (2015.04);
(Continued)

(58) Field of Classification Search
CPC ........... H01M 10/654; H01M 10/6571; H01M 10/6572
See application file for complete search history.

(56) References Cited

U.S. PATENT DOCUMENTS 6,127,619 A * 10/2000 Xi .......................... H01L 35/16
136/201
2003/0186116 A1* 10/2003 Tanjou ................ B60L 11/1868
429/101

(Continued)

FOREIGN PATENT DOCUMENTS

JP  2004-063397  *  2/2004
JP  2004-127744  *  4/2004
(Continued)

OTHER PUBLICATIONS

Amatucci, G. et al., "Fluoride based electrode materials for advanced energy storage devices", Journal of Fluorine Chemistry, 2007. 128(4): p. 243-262.
(Continued)

*Primary Examiner* — Jonathan Crepeau
(74) *Attorney, Agent, or Firm* — Maginot Moore & Beck LLP

(57) ABSTRACT

In accordance with one embodiment, a solid-state battery system includes a first anode, a first cathode, a first solid-state electrolyte layer positioned between the first anode and the first cathode, a housing enclosing the first anode, the first cathode, and the first solid-state electrolyte layer, and at least one thermal control wire positioned within the housing and configured to modify a temperature within the housing.

16 Claims, 4 Drawing Sheets

(51) Int. Cl.
| | |
|---|---|
| H01M 10/654 | (2014.01) |
| H01M 4/75 | (2006.01) |
| H01M 10/6571 | (2014.01) |
| H01M 10/6572 | (2014.01) |
| H01M 10/052 | (2010.01) |
| H01M 10/0562 | (2010.01) |
| H01M 10/0585 | (2010.01) |
| H01M 10/615 | (2014.01) |
| H01M 10/613 | (2014.01) |
| H01M 2/14 | (2006.01) |
| H01M 10/42 | (2006.01) |
| H01M 10/637 | (2014.01) |

(52) U.S. Cl.
CPC ...... *H01M 10/6572* (2015.04); *H01M 10/637* (2015.04); *H01M 2010/4271* (2013.01)

(56) References Cited

U.S. PATENT DOCUMENTS

| | | | |
|---|---|---|---|
| 2008/0268333 A1* | 10/2008 | Barrella | H01M 2/1016 429/120 |
| 2010/0305762 A1 | 12/2010 | Chan et al. | |
| 2011/0300451 A1 | 12/2011 | Inda | |
| 2012/0285758 A1 | 11/2012 | Bell et al. | |

FOREIGN PATENT DOCUMENTS

| | | |
|---|---|---|
| JP | 2011100622 A | 5/2011 |
| KR | 1020000047663 A | 7/2000 |
| KR | 1020100032436 A | 3/2010 |

OTHER PUBLICATIONS

Cabana, J. et al., "Beyond Intercalation-Based Li-Ion Batteries: The State of the Art and Challenges of Electrode Materials Reacting Through Conversion Reactions", Advanced Energy Materials, 2010. 22(35): p. E170-E192.

USABC Goals for Advanced Batteries for EVs. 2002, United States Advanced Battery Consortium. http://www.uscar.org/commands/files_download.php?files_id=27.

Ohtomo, T. et al., "All solid-state lithium secondary batteries using the 75Li2S-25P2S5 glass an the 70Li2S-30P2S5 glass-ceramic as solid electrolytes", Journal of Power Sources 233 (2013) 231-235.

Wiers et al. "A Solid Lithium Electrolyte via Addition of Lithium Isopropoxide to a Metal-Organic Framework with Open Metal Sites," Journal of American Chemical Society, 2011, 133 (37), pp. 14522-14525.

Christensen et al., "A critical Review of Li/Air Batteries", Journal of the Electrochemical Society 159(2) 2012, R1-R30.

Murugan et al., "Fast Lithium Ion Conduction in Garnet-Type Li7La3Zr2O12", Agnew. Chem. Int. Ed. 2007, 46, 7778-7781.

Jee et al., "Characteristics of a new type of solid-state electrolyte with a LiPON interlayer for Li-ion thin film batteries", Solid State Ionics 181 (2010) 902-906.

Kamaya, N. et al., "A lithium superionic conductor," Nature Materials vol. 10, Sep. 2011.

International Search Report and Written Opinion corresponding to PCT Application No. PCT/US2014/052914, dated Dec. 10, 2014 (11 pages).

Supplementary European Search Report corresponding to European Application No. 14 84 1310 (10 pages).

* cited by examiner

SOLID STATE BATTERY WITH
INTEGRATED RATE BOOSTER

CROSS REFERENCE

This application claims the benefit of U.S. Provisional Application No. 61/870,817 filed Aug. 28, 2013, the entire contents of which is herein incorporated by reference.

FIELD OF THE DISCLOSURE

The present disclosure relates to batteries and more particularly to solid state batteries.

BACKGROUND

Batteries are a useful source of stored energy that can be incorporated into a number of systems. Rechargeable lithium-ion ("Li-ion") batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (measured in Wh/kg) and energy density (measured in Wh/L) compared to batteries with conventional carbonaceous negative electrodes.

When high-specific-capacity negative electrodes such as lithium are used in a battery, the maximum benefit of the capacity-increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, and $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, *Fluoride based electrode materials for advanced energy storage devices*. Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Thus the advantage of using a Li metal negative electrode (sometimes referred to as an anode) is the much higher energy density of the entire cell, as compared to cells with graphitic or other intercalation negative electrodes. A disadvantage of using pure Li metal is that lithium is highly reactive. Accordingly, the lithium metal has a propensity to undergo morphology changes, which cause structures having a high surface area to form on and around the negative electrode when the cell is being charged. Exemplary high surface area structures include dendrites and mossy structures.

Dendrites are the most common failure mode for cells with Li metal anodes. The dendrites form with a needle-like structure and can grow through the separator during charging of the cell, resulting in an internal short. "Soft shorts" that burn out rapidly result in a temporary self-discharge of the cell, while "strong shorts" consisting of a higher, more stable contact area can lead to complete discharge of the cell, cell failure, and even thermal runaway. While dendrites typically grow through the separator during charge, shorts can also develop during discharge depending on the external pressure placed on the cell and/or internal volume changes that occur in both the negative and positive electrodes.

Because Li metal is highly electronically conductive, the surface of the Li tends to roughen as the metal is plated and stripped. Peaks in the surface grow as dendrites during charge. During discharge, some smoothing of the dendrites occurs. Nonetheless, there is typically some roughness that remains at the end of discharge. Depending on the depth of discharge, the overall roughness can be amplified from one cycle to the next. Because the metal is essentially at the same electrochemical potential throughout, potential and, to a lesser extent, concentration gradients in the electrolyte phase drive the change in morphology.

Related to dendrite initiation and growth is development of the Li morphology, which tends to increase the electrode surface area with cycling and consumes solvent to generate fresh passivation layers. Formation of high-surface-area mossy Li tends to occur during low-rate deposition from a liquid electrolyte, especially if the salt concentration is high. The high surface area combined with high reactivity of Li and flammability of the organic solvent makes for a very reactive and dangerous cell.

Another significant challenge in realizing a commercially viable battery incorporating a Li metal anode is the high Li metal interfacial resistance, and the slow transport of Li in the materials typically present in a solid state cell containing Li metal, as well as kinetics of Li transfer between phases on the cathode side of the cell. For example, typical solid state electrolyte materials have maximum ionic conductivities at room temperature of up to $10^{-3}$ S/cm. This is insufficient for power demanding applications such as those which require ionic conductivities greater than $10^{-2}$ S/cm.

Moreover, certain operational modes of a battery or battery system in automotive applications may demand even higher conductivities to realize high power output/input to absorb brake energy, for acceleration or for fast charging. These situations may occur repeatedly for limited times during operation and it may be necessary to quickly increase the conductivity of the electrolyte.

While increased temperatures are known to increase the conductivity of the electrolytes, the high heat capacity of a full battery pack makes it impractical to heat the whole system quickly when needed. Furthermore, the energy required to permanently maintain the battery at a high temperature (>80° C.) renders the system too inefficient. Such elevated temperatures may also impact and/or limit the use of certain cell, stack and pack components that may be sensitive to elevated temperatures.

What is needed, therefore, is a solid state electrochemical cell which addresses one or more of the above identified issues.

SUMMARY

In accordance with one embodiment, a solid-state battery system includes a first anode, a first cathode, a first solid-state electrolyte layer positioned between the first anode and the first cathode, a housing enclosing the first anode, the first cathode, and the first solid-state electrolyte layer, and at least one thermal control wire positioned within the housing and configured to modify a temperature within the housing.

In one or more embodiments the at least one thermal control wire is located within the first solid-state electrolyte layer.

In one or more embodiments the at least one thermal control wire includes a resistive wire.

In one or more embodiments the at least one thermal control wire includes a thermoelectric material.

In one or more embodiments the at least one thermal control wire is in electrical communication with the first anode and the first cathode.

In one or more embodiments the battery system includes a variable resistive load, wherein the at least one thermal control wire is in electrical communication with the first anode through the variable resistive load, and a battery management system configured to control the variable resistive load to modify a temperature in the first solid-state electrolyte layer.

In one or more embodiments the battery management system is further configured to identify a failure of the cell, and cool the first solid-state electrolyte layer using the at least one thermal control wire in response to the identified failure.

In one or more embodiments the battery system includes a first current collector operably connected to the first cathode, wherein the at least one thermal control wire is further positioned at an interface of the first current collector and the first cathode.

In one or more embodiments the battery system includes a second current collector operably connected to the first anode, wherein the at least one thermal control wire is further positioned at an interface of the second current collector and the first anode.

In one or more embodiments the at least one thermal control wire is configured to cool the first current collector and heat the first solid-state electrolyte layer.

In one or more embodiments the battery system includes a second anode within the housing and spaced apart from the first cathode by a base layer, a second cathode, and a second solid-state electrolyte layer positioned between the second anode and the second cathode, wherein the at least one thermal control wire is located within the second solid-state electrolyte layer.

In one or more embodiments a method of forming a solid-state battery system includes providing a first anode within a housing, providing a first cathode within the housing, positioning a first solid-state electrolyte layer within the housing between the first anode and the first cathode, positioning at least one thermal control wire within the housing, and configuring the at least one thermal control wire to modify a temperature within the housing.

In one or more embodiments positioning at least one thermal control wire within the housing includes positioning the at least one thermal control wire within the first solid-state electrolyte layer.

In one or more embodiments positioning at least one thermal control wire within the housing includes sintering a thermoelectric ceramic in a channel in the first solid-state electrolyte layer.

In one or more embodiments positioning at least one thermal control wire within the housing includes placing the at least one thermal control wire in electrical communication with the first anode and the first cathode.

In one or more embodiments placing the at least one thermal control wire in electrical communication with the first anode includes placing the at least one thermal control wire in electrical communication with the first anode through a variable resistive load, and the method further includes configuring a battery management system to control the variable resistive load to modify a temperature in the first solid-state electrolyte layer.

In one or more embodiments configuring the battery management system includes configuring the battery management system to identify a failure of the cell, and configuring the battery management system to control cooling of the first solid-state electrolyte layer using the at least one thermal control wire in response to the identified failure.

In one or more embodiments positioning the at least one thermal control wire includes positioning the at least one thermal control wire at an interface of a first current collector and the first cathode.

In one or more embodiments positioning the at least one thermal control wire includes positioning the at least one thermal control wire at an interface of a second current collector and the first anode.

In one or more embodiments configuring the at least one thermal control wire to modify the temperature within the housing includes configuring the at least one thermal control wire to cool the second current collector, and configuring the at least one thermal control wire to heat the first solid-state electrolyte layer.

DESCRIPTION

Figure 1:
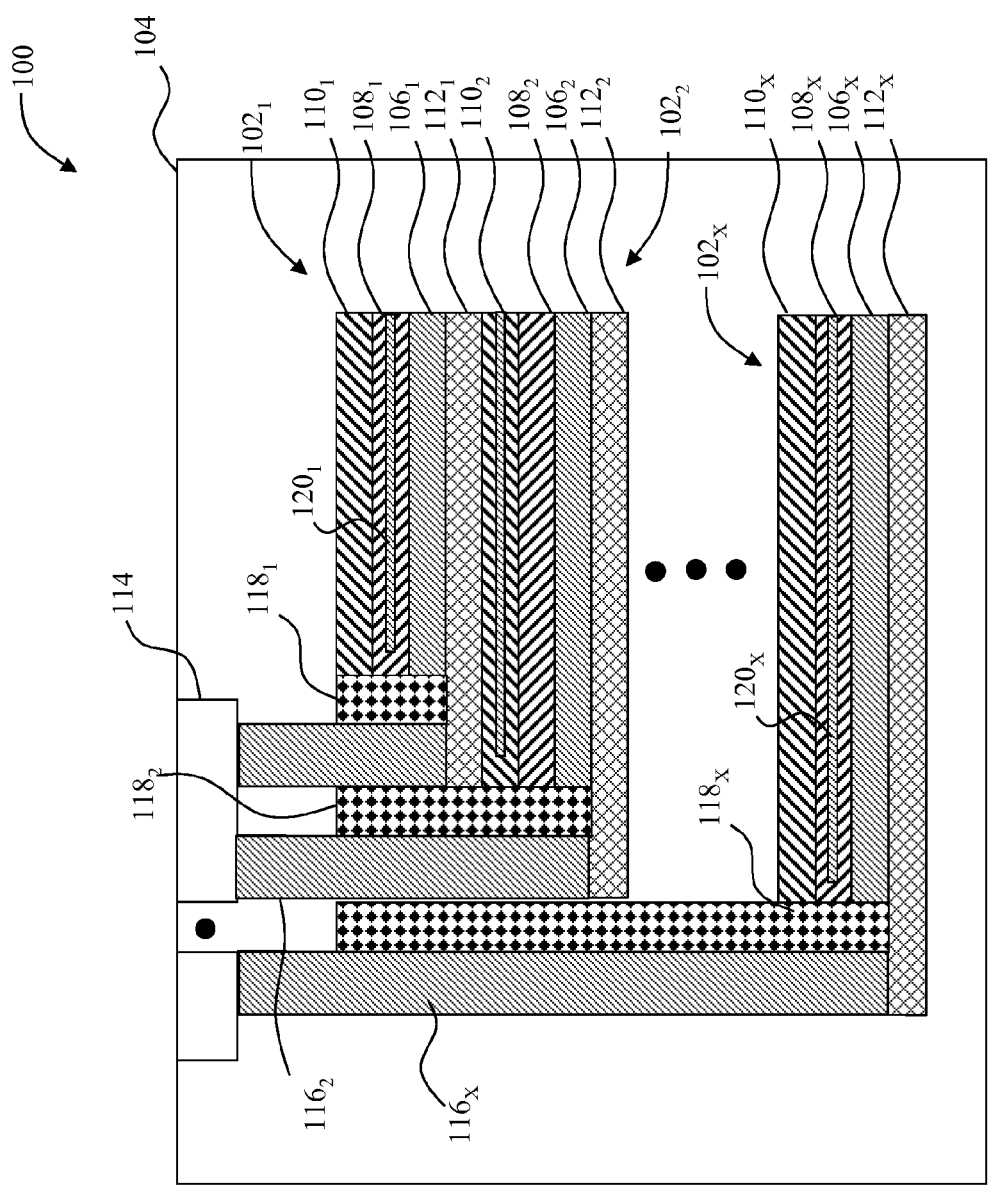
FIG. 1 depicts a simplified cross sectional view of an electrochemical cell.

For the purpose of promoting an understanding of the principles of the disclosure, reference will now be made to the embodiments illustrated in the drawings and described in the following written description. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

FIG. 1 depicts an electrochemical battery 100. The electrochemical battery 100 includes a number of cells or cell stacks $102_X$ within a packaging 104 or other surrounding environment that is both electrically insulating and (optionally) thermally conductive. The packaging 104 improves the safety of the electrochemical battery 100.

Figure 3:
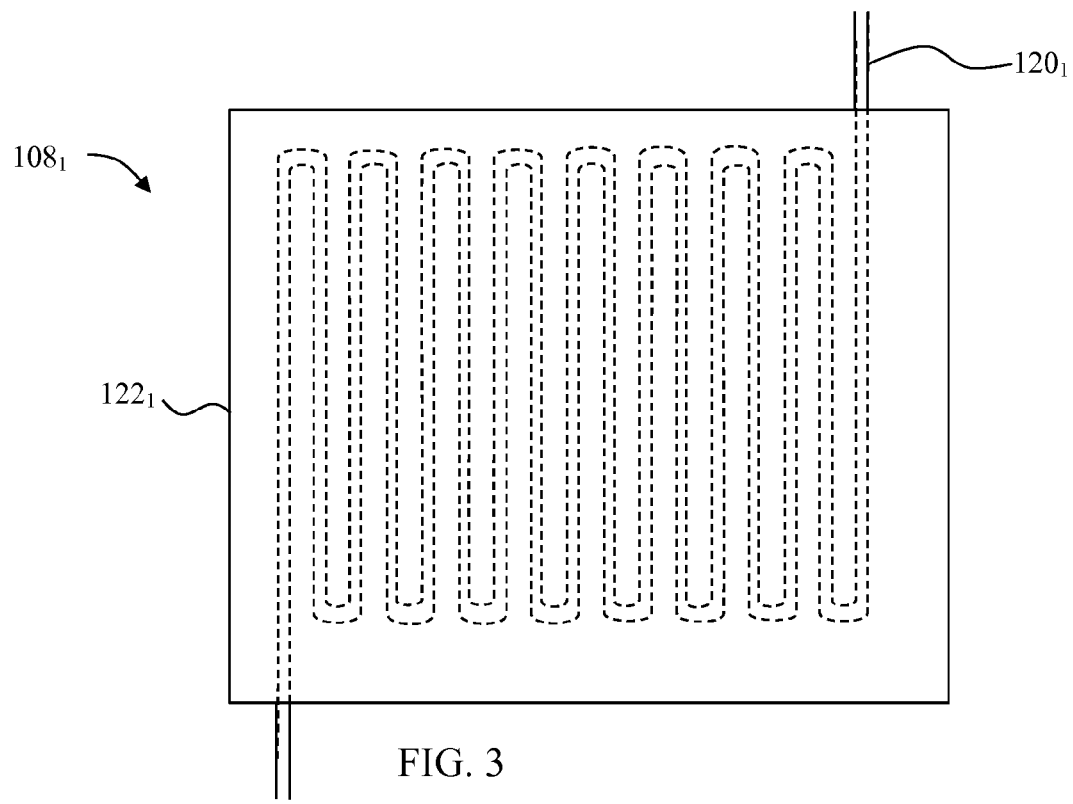
FIG. 3 depicts an aerial view of the cathode of FIG. 2 showing a sinusoidal positioned thermal control wire.

By stacking the cells $102_X$ in the bipolar design of FIG. 3, the operating voltage of the battery 100 can be modified to the desired voltage. By way of example, if each cell $102_X$ has an operating voltage of ~4 V, 100 cells $102_X$ can be stacked to produce a device that has an operating voltage of ~400 V. In this way, a given power can be achieved while passing a low current through each of the cells $102_X$. Therefore, wiring of the cells $102_X$ can be achieved with small-diameter electrical conductors while maintaining high energy efficiency. The battery 100 thus provides an operating voltage greater than 5 V, and in some embodiments, greater than 50 V.

Each of the cells $102_X$ includes an anode $106_X$, a separator $108_X$, and a cathode $110_X$. A base layer $112_X$, which is typically metal such as copper and can serve as a current collector as well as a feedthrough to an integrated circuit or multiplexor 114, is positioned adjacent to the anode $106_X$ and between the anode $106_X$ and an adjacent cathode. For example, the base layer $112_1$ is located between the anode $106_1$ and the cathode $110_2$.

While the multiplexor 114 is depicted within the packaging 104, in some embodiments the multiplexor 114 is provided external to the packaging 104. The multiplexer 114 may be a solid-state device with insulating material between the electronic leads $116_X$ which connect the multiplexor 114 to the base layers $112_X$. The leads $116_X$ of the multiplexer 114 which contact each terminal of the cell stack may extend to the top of the cell to an electrical circuit used for monitoring and controlling the current through each of the leads. Insulators $118_X$ are located between the leads $116_X$ and the ends of the anodes $106_X$, separators $108_X$, and cathodes $110_X$.

The anodes $106_X$ include Li metal or some other Li-insertion material that can reversibly insert and extract Li ions electrochemically. The anodes $106_X$ are sized such that they have at least as much capacity as the associated cathode $110_X$, and preferably at least 10% excess capacity and up to greater than 50% capacity in some embodiments.

The cathodes $110_X$ in various embodiments include a sulfur or sulfur-containing material (e.g., PAN-S composite or $Li_2S$); an air electrode or $Li_2O_2$ containing electrode; Li-insertion materials such as NCM, $LiNi_{0.5}Mn_{1.5}O_4$, Li-rich layered oxides, $LiCoO_2$, $LiFePO_4$, $LiMn_2O_4$; Li-rich NCM, NCA, and other Li intercalation materials, or blends thereof or any other active material or blend of materials that react with and/or insert Li cations and/or electrolyte anions. The cathodes $110_X$ may be fully dense. The cathodes $110_X$ may include Li-conducting polymer, ceramic or other solid, non-polymer electrolyte. The cathode Li-insertion materials may additionally be coated (e.g., via spray coating) with a material such as $LiNbO_3$ in order to improve the flow of ions between the Li-insertion materials and the solid electrolyte, as described in T. Ohtomo et al., Journal of Power Sources 233 (2013) 231-235. Solid electrolyte materials in the cathodes $110_X$ may further include lithium conducting garnets, lithium conducting sulfides (e.g., $Li_2S$—$P_2S_5$) or phosphates, $Li_3P$, LIPON, Li-conducting polymer (e.g., PEO), Li-conducting metal-organic frameworks such as described by Wiers et al. "A Solid Lithium Electrolyte via Addition of Lithium Isopropoxide to a Metal-Organic Framework with Open Metal Sites," Journal of American Chemical Society, 2011, 133 (37), pp 14522-14525, the entire contents of which are herein incorporated by reference, thio-LISiCONs, Li-conducting NaSICONs, $Li_{10}GeP_2S_{12}$, lithium polysulfidophosphates, or other solid Li-conducting material. Other solid electrolyte materials that may be used are described in Christensen et al., "A critical Review of Li/Air Batteries", Journal of the Electrochemical Society 159(2) 2012, the entire contents of which are herein incorporated by reference. Other materials in the cathodes $110_X$ may include $Li_{7-x}La_3Ta_xZr_{2-x}O_{12}$, wherein $0 \leq X \leq 2$, electronically conductive additives such as carbon black, and a binder material. The cathode materials are selected to allow sufficient electrolyte-cathode interfacial area for a desired design.

Figure 2:
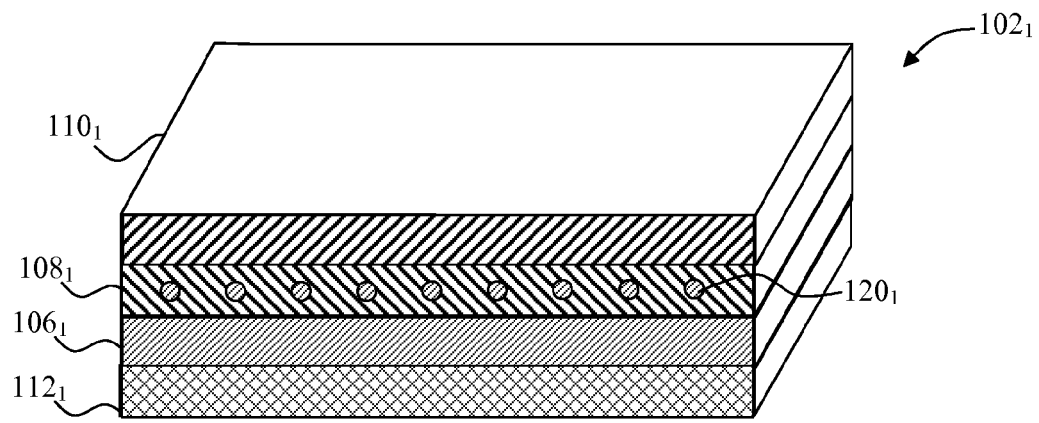
FIG. 2 depicts a partial side perspective view of the cell of FIG. 1 showing a separator with thermal control wires.

The separators $108_X$ are a Li-conducting solid electrolyte which are electronically insulating. The separators $108_X$ consist of one or more components, that may include LiPON, Li-conducting garnet (e.g., material with composition $Li_{7-x}La_3Ta_xZr_{2-x}O_{12}$, x=0 to 2), Li-conducting sulfide (e.g., $Li_2S$—$P_2S_5$), Li-conducting polymer (e.g., PEO), Li-conducting metal-organic frameworks, $Li_3N$, $Li_3P$, thio-LISiCONs, Li-conducting NaSICONs, $Li_{10}GeP_2S_{12}$, lithium polysulfidophosphates, or other solid Li-conducting material. The separators $108_X$ include thermal control wires $120_X$. The thermal control wires $120_X$ are substantially the same, and are discussed in further reference to the thermal control wire $120_1$ shown in FIGS. 2-3.

The thermal control wire $120_1$ is a sinusoidal wire which is embedded within the material $122_1$ used to form the separator $108_1$. The thermal control wire $120_1$ in some embodiments is a resistive wire laminated or sintered in the electrolyte bulk material $122_1$. The Li-ions flow through the bulk material $122_1$ and pass the thermal control wire $120_1$ in vertical direction in the orientation of FIG. 2. Due to the low thickness of the thermal control wire $120_1$ (on the order of microns) the available ion conducting area/volume of the electrolyte is sufficient for unimpeded transport.

Figure 4:
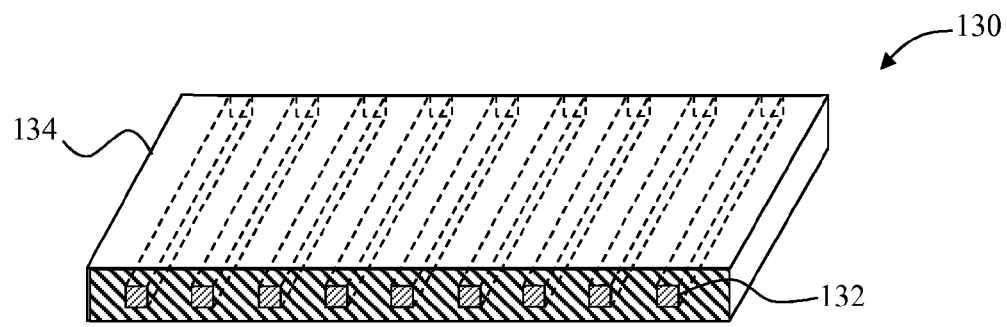
FIG. 4 depicts an top perspective view of a separator including thermal control wires in the form of thermoelectric material extending in channels through the separator.
Figure 5:
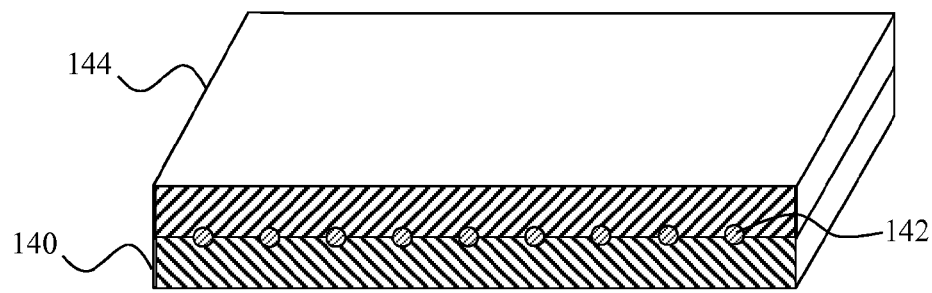
FIG. 5 depicts an top perspective view of a cell including thermal control wires in the form of thermoelectric material positioned between the separator and another component in the cell.

In some embodiments, the thermal control wire is a thermoelectric material to allow a cooling option. For example, FIG. 4 depicts a separator 130 with thermal control wires 132 in the form of thermoelectric material within channels in an electrolyte material 134. Thermoelectric ceramics can be sintered and included in channels through the electrolyte 134. FIG. 5 depicts an alternative embodiment which includes thermoelectric thermal control wires 142 at the interface between a layer 140 and another layer 144. In different embodiments, the thermal control wires are positioned between one or more of the anode and the anode current collector, and the cathode and the cathode current collector, the cathode and the separator, and the anode and the separator, in addition to or as an alternative to positioning a thermal control wire in the separator. Thermoelectric materials in different embodiments include $Bi_2Te_3$, $Bi_2Se_3$, PbTe, $PbTe_{1-x}Se_x$, $Mg_2Si$, $Mg_2Sn$, $Mg_2Ge$ and others.

The thermal control wires 132/142 allow local heating or cooling of a specific cell volume due to the thermoelectric effect that generates a heat flow in a defined direction depending on the electronic current direction through the material. For embodiments where the thermoelectric material is located at the interface between an electrode and a current collector, the thermoelectric material can be used to heat the internal ion transporting parts (electrode and electrolyte) of the cell while the current collector can be cooled at the same time. This means ionic transport is significantly improved because ionic conductivity increases with higher temperature. At the same time the current collector is cooled, because the thermoelectric transports heat to the inside of the cell. This means the electronic conductivity of the metallic current collector is also improved because the temperature dependence of the electronic conductivity in metals is just opposite to the behavior of ionic conductors. As a consequence the current collectors can be designed at a smaller thickness but can still carry enough current for high rate capability.

By reversing the current direction through the thermoelectric wire, the heat flow can be reversed and the internal layers of the cell are cooled while the current collectors act as heat sinks Thus a solid thin-film electrolyte (thickness of about several 10 microns) is cooled rapidly and its ionic conductivity is dramatically lowered. In some embodiments, this feature/operation mode is used to shut down the cell in case of a sensed failure.

Figure 6:
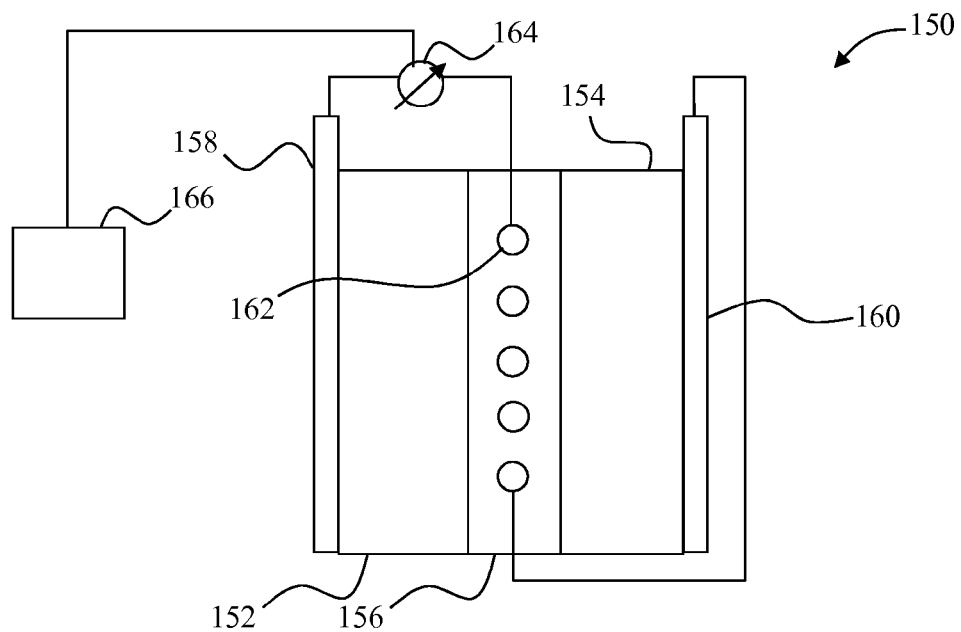
FIG. 6 depicts a schematic of a system including a battery control system where the cell is used to provide current to control the temperature of the electrolyte.

FIG. 6 depicts one embodiment of powering a thermal control (such as a resistive wire or a thermoelectric material). In FIG. 6, a cell 150 includes an anode 152, a cathode 154, and a separator 156. A current collector 158 is provided for the anode 152 while a current collector 160 is provided for the cathode 154. A thermal control wire 162 which in this embodiment is a resistive wire but which is a thermoelectric material in other embodiments, is provided within the separator 156. One end of the thermal control wire 162 is connected to the cathode current collector 160 while the other end of the thermal control wire 162 is connected to the anode current collector 158 through a variable resistive load 164. The variable resistive load 164 is controlled by a battery management system (BMS) 166. The BMS includes a memory having program instructions stored therein and a processor operably connected to the memory and configured to execute the program instructions to control the resistive load 164 to effect a desired temperature in one or more of the components of the battery 100.

In other embodiments, the thermal control wire 162 is not controlled by a BMS. In such embodiments, one lead of the thermal control wire 162 is connected to the cathode or the anode while the other lead is connected through the external circuit back to the anode or cathode respectively. This means the current through the thermal control wire 162 is proportional to the current through the battery and the system is intimately coupled.

Figure 7:
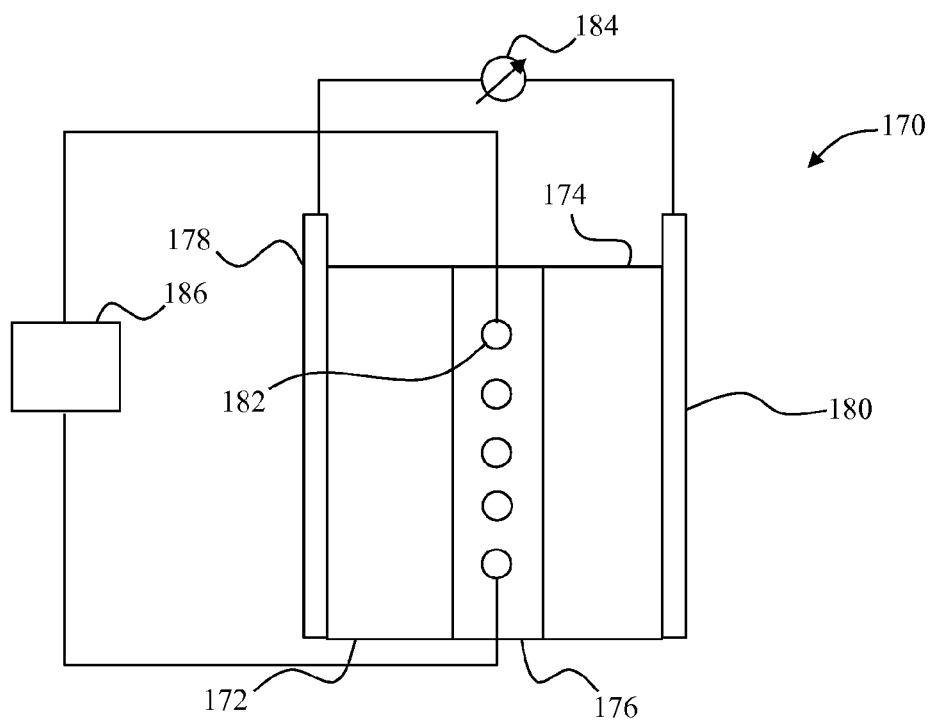
FIG. 7 depicts a schematic of a system including a battery control system where an external source is used to provide current to control the temperature of the electrolyte.

In further embodiments, an external source is used to provide heating/cooling using a thermal control wire. For example, FIG. 7 depicts a cell 170 includes an anode 172, a cathode 174, and a separator 176. A current collector 178 is provided for the anode 172 while a current collector 180 is provided for the cathode 174. A thermal control wire 182 which in this embodiment is a resistive wire but which is a thermoelectric material in other embodiments, is provided within the separator 176. The anode current collector 178 and the cathode current collector 180 are connected to an external load 184 while the thermal control wire is operably connected to a BMS 186. The BMS drives or controls the magnitude and direction of current through the wire or thermoelectric material and controls depending on the desired operation mode of the battery.

While a number of different embodiments have been described above, the features and elements of the various embodiments are used with the features and elements of the other embodiments in some applications.

The above described embodiments provide thermal control wires that allow local modification of the temperature of a solid electrolyte and hence increase its conductivity when needed for more power demanding operation modes of the battery system. The thermal control wires can be controlled by the battery management system (BMS) and be directly powered by the battery system or by a separate external energy source. In some embodiments, a thermoelectric conductor that can redistribute heat within a solid state cell, stack or pack is provided in order to increase the local temperature of ionic conductors (increases ionic conductivity) and simultaneously cool the metallic current collectors and other electronic conductors (cooling decreases electronic resistance).

The above described embodiments can be readily fabricated using existing technology such as that developed for heater elements in lambda sensors (i.e. use of metallic past printing, sintering of conductive materials). The embodiments can be made using simple metallic materials as a resistive heater like aluminum, platinum, nickel, and alloys like AlNiCo and Constantan among others.

Advantageously, the above described embodiments exhibit much lower energy consumption than heating a complete stack or pack with large heat capacity. The described embodiments provide quick response of the system, because only a thin electrolyte layer (low heat capacity) has to be heated.

Moreover, the described embodiments have a low impact on the chemistries of cathode and anode, because they are not affected by an overall increased system temperature. A BMS can be used to provide simple control of the embodiments. When embodied as a resistive wire, the resistive heater (resistance=R) can be directly connected to the circuit between battery and external load leading to a heating power P proportional to the square of the current I ($P=R*I^2$). This can be useful for applications that require a direct connection of the heating feature to the current through the battery without the use of a battery management system (BMS).

The described embodiments can provide a cooling feature (e.g. for emergency shutdown of the battery by freezing the ions) by integration of thermoelectric materials instead of a purely resistive heater. The direction of current through the thermoelectric heater determines whether a certain area within the cell is heated or cooled.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A solid-state battery system, comprising:
a first anode;
a first cathode;
a first solid-state electrolyte layer positioned between the first anode and the first cathode;
a housing enclosing the first anode, the first cathode, and the first solid-state electrolyte layer;
a first current collector operably connected to the first cathode; and
at least one thermal control wire positioned at an interface of the first current collector and the first cathode and configured to selectively increase a temperature within the housing and selectively decrease the temperature within the housing, wherein the at least one thermal control wire comprises a thermoelectric material.

2. The battery system of claim 1, wherein the at least one thermal control wire comprises a resistive wire.

3. The battery system of claim 1, wherein the at least one thermal control wire is in electrical communication with the first anode and the first cathode.

4. The battery system of claim 3, further comprising:
a variable resistive load, wherein the at least one thermal control wire is in electrical communication with the first anode through the variable resistive load; and
a battery management system configured to control the variable resistive load to selectively increase the temperature in the first solid-state electrolyte layer.

5. The battery system of claim 4, wherein the battery management system is further configured to:
identify a failure of the cell; and cool the first solid-state electrolyte layer using the at least one thermal control wire in response to the identified failure.

6. The battery system of claim 1, further comprising:
a second current collector operably connected to the first anode, wherein the at least one thermal control wire is further positioned at an interface of the second current collector and the first anode.

7. The battery system of claim 1, wherein the at least one thermal control wire is configured to selectively cool the first current collector and selectively heat the first solid-state electrolyte layer.

8. The battery system of claim 1, further comprising:
a second anode within the housing and spaced apart from the first cathode by a base layer;
a second cathode; and
a second solid-state electrolyte layer positioned between the second anode and the second cathode, wherein the at least one thermal control wire is located within the second solid-state electrolyte layer.

9. A method of forming a solid-state battery system, comprising:
providing a first anode within a housing;
providing a first cathode within the housing;
positioning a first solid-state electrolyte layer within the housing between the first anode and the first cathode;
positioning at least one thermal control wire within the housing at an interface of a first current collector and the first cathode; and
configuring the at least one thermal control wire to selectively increase a temperature within the housing and selectively decrease the temperature within the housing.

10. The method of claim 9, wherein positioning at least one thermal control wire within the housing further comprises:
positioning the at least one thermal control wire within the first solid-state electrolyte layer.

11. The method of claim 10, wherein positioning at least one thermal control wire within the housing comprises:
sintering a thermoelectric ceramic in a channel in the first solid-state electrolyte layer.

12. The method of claim 9, wherein positioning the at least one thermal control wire within the housing comprises:
placing the at least one thermal control wire in electrical communication with the first anode and the first cathode.

13. The method of claim 12, wherein placing the at least one thermal control wire in electrical communication with the first anode comprises:
placing the at least one thermal control wire in electrical communication with the first anode through a variable resistive load, and the method further comprises
configuring a battery management system to control the variable resistive load to modify a temperature in the first solid-state electrolyte layer.

14. The method of claim 13, wherein configuring the battery management system comprises:
configuring the battery management system to identify a failure of the system; and
configuring the battery management system to control cooling of the first solid-state electrolyte layer using the at least one thermal control wire in response to the identified failure.

15. The method of claim 9, wherein positioning the at least one thermal control wire comprises:
positioning the at least one thermal control wire at an interface of a second current collector and the first anode.

16. The method of claim 9, wherein configuring the at least one thermal control wire to selectively increase the temperature within the housing and selectively decrease the temperature within the housing comprises:
configuring the at least one thermal control wire to selectively cool the second current collector; and
configuring the at least one thermal control wire to selectively heat the first solid-state electrolyte layer.

\* \* \* \* \*